United States Patent [19]
Dotson

[11] Patent Number: 5,630,289
[45] Date of Patent: May 20, 1997

[54] FISHING LURE AND KIT

[76] Inventor: Allen R. Dotson, 2020 Panorama Dr., Bull Head City, Ariz. 86442

[21] Appl. No.: 446,241

[22] Filed: May 22, 1995

[51] Int. Cl.⁶ .................................................. A01K 85/00
[52] U.S. Cl. .................... 43/42.09; 43/42.39; 43/44.8; 43/42.28
[58] Field of Search .................... 43/42.28, 42.09, 43/42.39, 44.8, 42.29

[56] References Cited

U.S. PATENT DOCUMENTS

| | | | |
|---|---|---|---|
| 3,172,227 | 3/1965 | Mackey | 43/42.09 |
| 3,359,674 | 12/1967 | Strumor | 43/42.09 |
| 3,427,744 | 2/1969 | Roberts | 43/42.39 |
| 3,497,987 | 3/1970 | Perrin | 43/42.39 |
| 4,334,381 | 6/1982 | Carver | 43/44.8 |
| 4,777,758 | 10/1988 | Phillips | 43/42.09 |
| 4,858,367 | 8/1989 | Rabideau | 43/42.39 |
| 4,907,364 | 3/1990 | Hedman | 43/44.8 |
| 4,920,688 | 5/1990 | Devereaux | 43/42.39 |
| 5,209,007 | 5/1993 | Southerland | 43/42.09 |
| 5,301,453 | 4/1994 | Terrill | 43/42.09 |

*Primary Examiner*—Kurt Rowan
*Attorney, Agent, or Firm*—Edward E. Roberts

[57] ABSTRACT

A fishing lure and a kit for forming the lure including at least one main pliable body member of somewhat cylindrical configuration having a concavity at one end for receiving one of first and second barbed ends of a first barbed shaft member and a second bi-directional barbed shaft. The barbed shaft member is provided with and an array of cilia-like projections secured to the other end, either by tying or by attachment via a flanged end and a flexible washer. The array of cilia may include animal hair, feather strips or synthetic hairs. A fish hook is provided for securing to and through the other end of the main pliable body member. In addition, a pliable component is provided, the component being configured to simulate a body portion of a fish forage creature, such as a portion of a shrimp or a crab or the like. The bi-directional barb member is provided for insertion into the concavity of the main body member and pliable component for interconnection thereof. The component parts may be provided in a plurality of like components of an assortment of colors and textures.

10 Claims, 4 Drawing Sheets

5,630,289

FISHING LURE AND KIT

BACKGROUND OF THE INVENTION

1. Field of the Invention

This invention relates to fishing lures, and more particularly to an arrangement of components which may be assembled in kit form to readily enable a fisherman to assemble and disassemble lure components at will according to perceived need.

2. Description of Prior Art

Fishing lures take various forms, some with generally rigid bodies and some with flexible bodies. Many come in an assortment of colors and sizes for different game fish and different fishing sources, that is, for fishing in ponds, oceans, streams and rivers. Fisherman utilize different lures for different purposes, however, even when fishing for a given game fish in a given source, sometimes a fisherman is not having any luck with a particular lure and tries another. In most instances, this requires detaching one lure and attaching another. Depending on the method of affixing the lure to the line, this can become time consuming and ultimately frustrates a fisherman from making too many lure changes. Lures generally have a configuration which simulates the appearance and movement of natural game fish forage creatures, such as earthworms, shrimp, crabs, minnows, squid, frogs, tadpoles and the like.

In accordance with a feature of the present invention, there is provided a new and improved lure and kit of components for enabling rapid changeover to form other lures to simulate other forage creatures when a particular arrangement is not performing as hoped.

SUMMARY OF THE INVENTION

The foregoing and other objects of the invention are accomplished by providing a lure and a kit for making such lures including at least one main pliable body member of somewhat cylindrical configuration having a concavity at one end for receiving one of first and second barbed ends of a first barbed shaft member and a second bi-directional barbed shaft.

The barbed shaft member is provided with an array of cilia-like projections secured to the other end, either by tying or by attachment via a flanged end and a flexible washer. The array of cilia may include animal hair, feather strips or synthetic hairs. A fish hook is provided for securing to and through the other end of the main pliable body member.

In addition, a pliable component is provided, the component being configured to simulate a body portion of a fish forage creature, such as a portion of a shrimp or a crab or the like. The bi-directional barb member is provided for insertion into the concavity of the main body member and the pliable component for interconnection thereof. The component parts may be provided in a plurality of like components of an assortment of colors and textures.

Other objects, features and advantages of the invention will become apparent on a reading of the specification when taken in conjunction with the drawings in which like reference numerals refer to like elements in the several views.

DESCRIPTION OF THE PREFERRED EMBODIMENT

Figure 1:
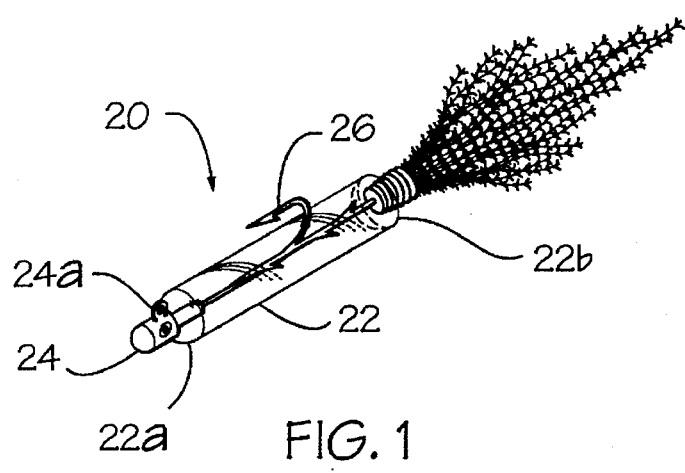
FIG. 1 is a perspective view of a jig or grub type lure formed from components in accordance with the invention.
Figure 2:
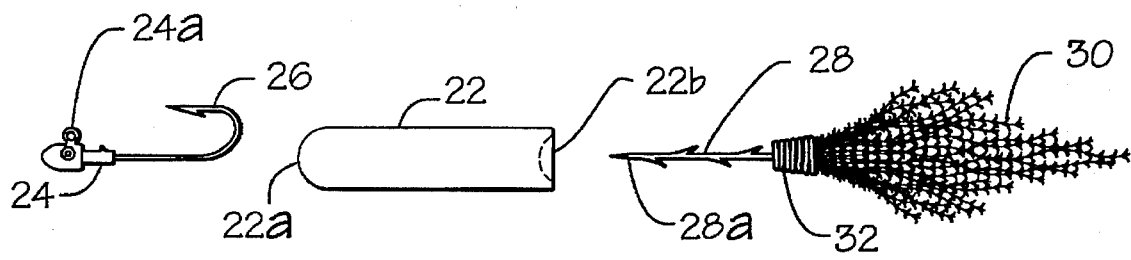
FIG. 2 is an exploded view of the lure of FIG. 1.

Referring now to the drawings and particularly to FIGS. 1 and 2, there is shown a lure, generally designated 20, which includes a flexible main body 22, which may be formed of rubber or other flexible synthetic plastic material in any one of a number of colors. The body 22 has a head end 22a and a concave tail end 22b. A grub type jig head 24 includes a fish hook 26 and an eye attachment 24a.

As shown in FIG. 2, an elongate barbed shaft 28 is provided with a pointed end 28a and a plurality of barbs extending from the sides thereof angled in a direction away from the shaft and away from the pointed end 28a. The shaft 28 is formed of any suitable material, such as a generally rigid plastic material. In essence, the shaft 28 is configured to facilitate insertion and deter removal. The other end of the shaft 28 has secured thereto an array 30 of flexible hair or cilia-like projections, in this instance feather strips, which are tied by cord 32, or otherwise secured, about the end of shaft 28.

As shown in FIG. 1, in the assembled condition, the hook 26 is passed into the body 22 with the main portion of the hook in alignment with the center axis of body 22, and with the barbed end of the hook 26 then passing out the side. The body 22 is of a length sufficient to enable the hook 26, on full insertion, to pass out the side generally at about the midpoint of body 22, which length is sufficient to enable the shaft 28 to pass into the body 22 a substantial portion of the length thereof to maintain the parts together during use.

Figure 3:
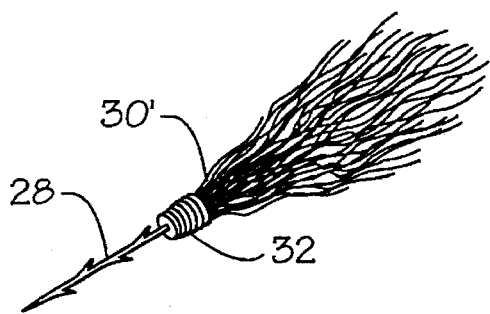
FIGS. 3 and 4 are perspective views of other components which may be substituted in the lure of FIG. 1.
Figure 4:
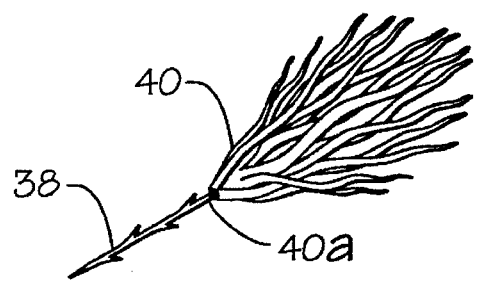
Figure 5:
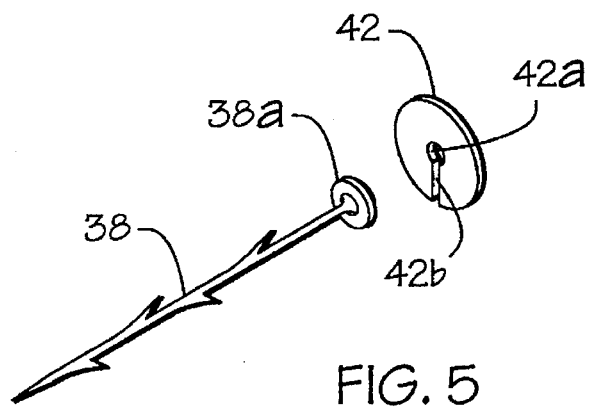
FIG. 5 is a perspective view of a barb assembly for use with the lure of FIG. 1.

FIGS. 3 and 4 show alternate arrangements or components for attachment to the rear of body 22. In FIG. 3, another array 30' is secured by cord 32, or otherwise, to the shaft 28, wherein the array 30' is formed of horse (or other animal) hair, which is sufficiently thin and durable to waver in the water during use. In FIG. 4 a different shaft member 38 (as shown in FIGS. 5 through 9) is employed. The array 40 of cilia-like projections is formed from a synthetic material, such as by molding, as a unitary member with a central connection point 40a, with the hair-like projections extending radially outwardly therefrom. As shown in FIGS. 5 through 9, the barbed shaft 38 is configured at the forward end identically to the forward or pointed end of shaft 28. However, at the other end, the shaft 38 terminates in a head or flange 38a. For retention purposes, a flexible rubber or plastic retaining washer 42 is provided with a central aperture 42a having a diameter equal to or less than the diameter of the shaft 38, but greater than the diameter of the flange 38a.

Figure 6:
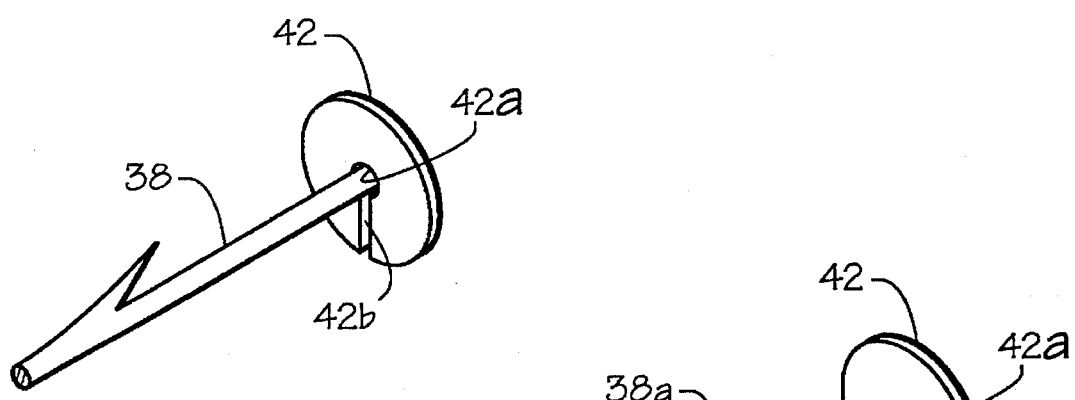
FIG. 6 is an enlarged fragmentary perspective view of the coupling end of the barb of FIG. 5.
Figure 7:
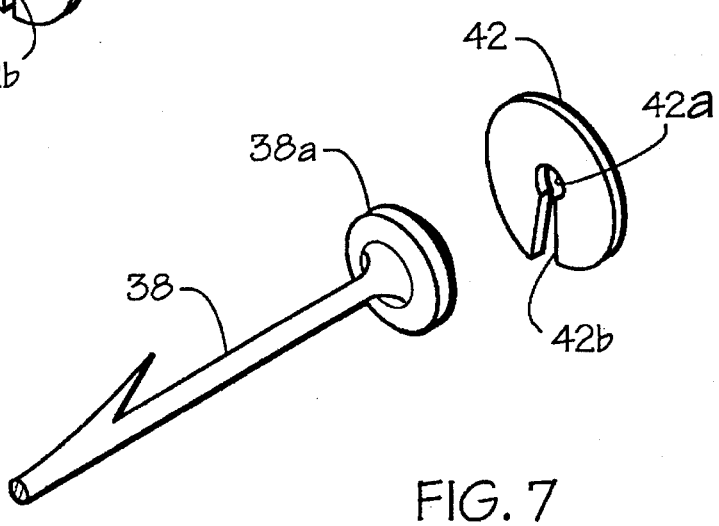
FIG. 7 is an exploded perspective view of the coupling end of FIG. 6.
Figure 8:
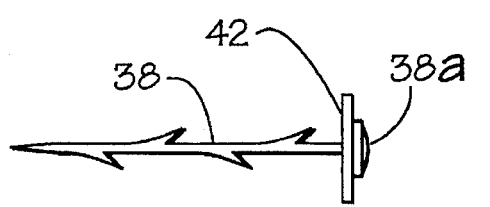
FIG. 8 is a side elevational view of the barb assembly of FIG. 5.
Figure 9:
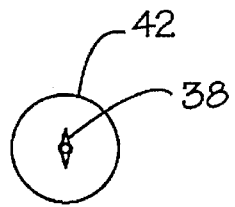
FIG. 9 is a side view of the barb assembly of FIG. 8 as viewed from the left end thereof.

Although not absolutely required, a radial slit 42b enables the washer 42 to be readily attached to the shaft 38 in proximate relation to the flange 38a as shown in FIGS. 6 and 7. With the skirt or array 40 then positioned on the shaft 38 by sliding the shaft 38 through the aperture 40a, the hair-like projections are then further radially outwards from the shaft 38 center axis to give the appearance of a larger lure, while providing more surface area for passage through the water, and thus, more animated action of the projections.

Of course, if desired, lure arrays such as 30 and 40 may be molded directly onto shafts such as 38 (FIG. 7). In this case flange 38a could be configured, such as in the form of ribs or rings, to facilitate molding thereabout of lure arrays or of a plastic body lure such as flexible body 50 described below.

Figure 10:
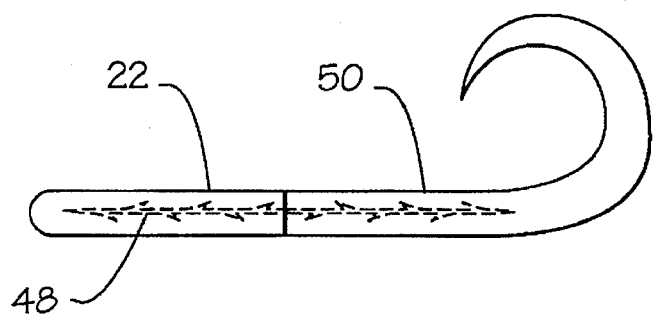
FIG. 10 is another partially assembled lure formed with a flexible tail portion and utilizing a different barb member.
Figure 11:
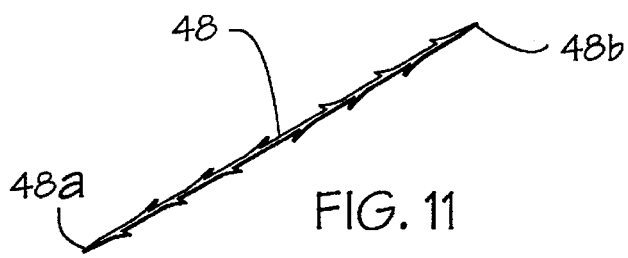
FIG. 11 is a perspective view of a bi-directional barb member used in the lure of FIG. 10.

Another lure form fabricated from parts of the lure kit is shown in FIG. 10, that is a main body 22 coupled in axial relation with another flexible component 50, configured in the form of a shrimp tail, by way of example. Referring also to FIG. 11, there is shown another elongate barbed shaft member, generally designated 48, which is utilized in the lure kit according to the invention for enabling fastening of the flexible component 50 to the main body 22.

The shaft 48 is bi-directional, that is both ends 48a and 48b are pointed, while the barbs in each half are angularly disposed relative to the axis of shaft 48 according to the particular half, that is each half has the barbs oriented rearwardly relative to the respective pointed end to facilitate insertion while deterring extraction or withdrawal. The two parts 22 and 50 are then connected in axially aligned relation by insertion of one-half of the shaft 48 into the body 22 and the other half of the shaft 48 into the flexible component 50.

Figure 12:
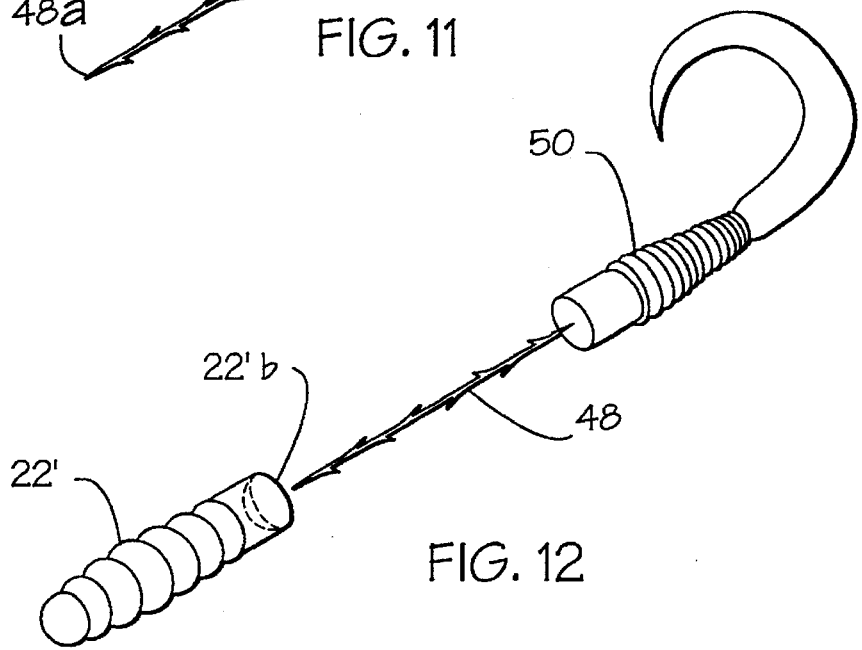
FIG. 12 is an exploded perspective view of the lure of FIG. 10.
Figure 13:
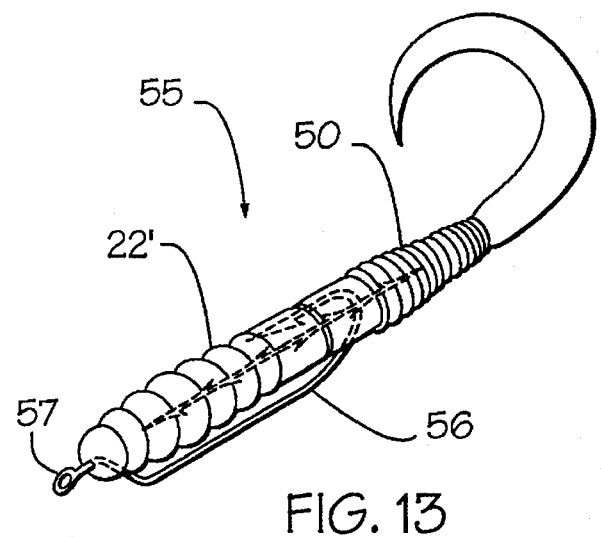
FIG. 13 is a perspective view of the lure of FIG. 10 with a hook inserted into the body thereof.

As can be seen the length of the shaft 48 portion extending into the tail of component 50 is of a distance less than the overall length of the component to enable the tail portion to have flexibility for wiggling during use in the water. FIG. 12 shows the parts in exploded relation prior to assembly, while FIG. 13 shows a lure 55 made from the parts with a hook 56 and hook eye 57 passing through the flexible body parts to complete the assembly.

In accordance with the invention, the main body 22 and the flexible component 50 may have any convenient external color, size or shape and configuration to simulate a game fish forage creature. As shown in FIG. 13, the exterior is provided with a serrated outer finish and tail appendage. However, either or both parts may be readily configured with laterally extending appendage portions to simulate claws or fins or the like.

Figure 14:
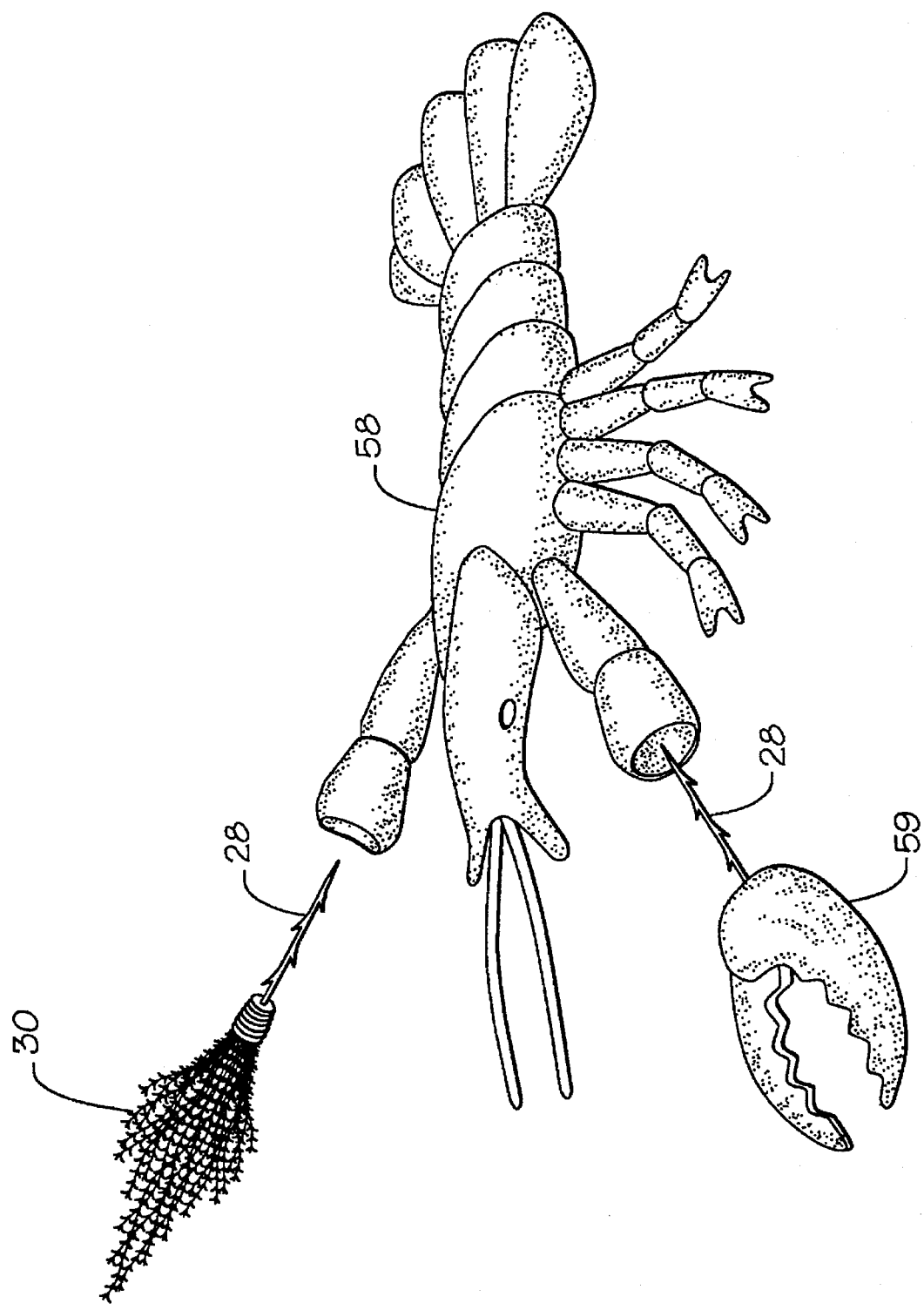
FIG. 14 is a perspective view of an example of lures capable of being assembled by the kit of the invention.

Yet another lure form fabricated from parts of the lure kit is shown in FIG. 14, that is a main body 58 having means for attachment thereto of an array 30 as shown in FIG. 2, as well as another appendage configured in the form of a claw 59, by way of example.

Although there has been shown and described a preferred embodiment, it is to be understood that other modifications may be made within the spirit and scope of the invention.

What is claimed is:

1. A kit for forming one or more fishing lures from an assortment of components comprising:

at least one main pliable body member of somewhat cylindrical configuration and having a concavity at one end thereof;

at least one means including a fish hook for securing to and through the other end of said main pliable body member;

at least one pliable component configured to simulate a body portion of a fish forage creature;

a bi-directional barb member for insertion into the concavity of said main body member and said pliable component for interconnection thereof;

at least one elongate barbed shaft member having a barbed end and a flanged end adjacent said barbed end, said barbed shaft member being insertable into said concavity for interconnection thereof;

at least one flexible disc washer having a radial slit therethrough; and at least one array of cilia-like projections having a center opening for attachment to said barbed shaft member with said disc washer attached adjacent said flange for retaining said cilia array thereon, said fishing lure being configuable by utilization of one of said body member, one of said means including a fish hook and one of said bi-directional barb member and said at least one barbed shaft member having a barbed end inserted into said cavity, whereupon with said bi-directional barb member, said pliable component is utilized and on selection of said at least one barbed shaft member having a barbed end, an array is used.

2. The kit of claim 1 further including at least one other member having a barbed end with cilia-like projections tied thereto for use in lieu of said at least one barbed shaft member having a barbed end.

3. The kit of claim 2 wherein said cilia-like projections include one of animal hair, feather strips or hair-like projections of synthetic material.

4. The kit of claim 1 wherein said flexible component includes a flexible tail member.

5. The kit of claim 1 wherein said body member has an outer configuration similar to the body of an earthworm.

6. The kit of claim 1 wherein said kit includes a plurality of each of said body, said component and said at least one barbed shaft member having a barbed end and an array of cilia-like projections.

7. The kit of claim 6 wherein the plurality of each of said body, said component and said at least one member having a barbed end and an array of cilia-like projections are configured in an array of different colors.

8. A fishing lure comprising:

a pliable body member of somewhat cylindrical configuration and having a concavity at one end thereof;

a jig head including a fish hook for securing to and through the other end of said main pliable body member; and a shaft member having a barbed end insertable into said concavity and an enlarged flange portion at the other end;

an integrally formed array of cilia-like projections having a central opening for positioning on said shaft; and a washer shaped member for positioning on said shaft adjacent said flange portion for retaining said array on said shaft.

9. A kit for forming one or more fishing lures from an assortment of components comprising:

at least one main pliable body member of somewhat cylindrical configuration and having a concavity at one end thereof;

at least one means including a fish hook for securing to and through the other end of said main pliable body member;

at least one pliable component configured to simulate a body portion of a fish forage creature;

a bi-directional barb member for insertion into the concavity of said main body member and said pliable component for interconnection thereof; and at least one member having a barbed end and an array of cilia-like projections secured to the other end, said barbed member being insertable into said concavity for interconection thereof, wherein said at least one member having a barberd end being formed of a barbed shaft member having a flanged and opposite the barbed end, a flexible disc washer having a radial slit therethrough and a flexible cilia array having a center opening for attachment to said barbed shaft said disc washer attached adjacent said flange for retaining said cilia array thereon.

10. The kit of claim 9 wherein said cilia-like projections include one of animal hair, feather strips or hair-like projections of synthetic material.

* * * * *